United States Patent
Sharma et al.

(10) Patent No.: US 11,416,446 B2
(45) Date of Patent: Aug. 16, 2022

(54) SYSTEMS AND METHODS FOR REMOTE MANAGEMENT OF NON-STANDARD DEVICES

(71) Applicant: Dell Products, L.P., Round Rock, TX (US)

(72) Inventors: Anurag Sharma, Cedar Park, TX (US); Chitrak Gupta, Bangalore (IN); Jo Ann Varble, Round Rock, TX (US); Rajib Saha, Bangalore (IN); Chandrasekhar Puthillathe, Bangalore (IN); Ramesha He, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 49 days.

(21) Appl. No.: 17/071,749

(22) Filed: Oct. 15, 2020

(65) Prior Publication Data

US 2022/0121619 A1 Apr. 21, 2022

(51) Int. Cl.
*G06F 16/11* (2019.01)
*G06F 16/17* (2019.01)
*G06F 9/445* (2018.01)

(52) U.S. Cl.
CPC ........ *G06F 16/122* (2019.01); *G06F 9/44526* (2013.01); *G06F 16/1734* (2019.01)

(58) Field of Classification Search
CPC . G06F 16/122; G06F 16/1734; G06F 9/44526
See application file for complete search history.

(56) References Cited

U.S. PATENT DOCUMENTS

| 2010/0280855 A1* | 11/2010 | Gupta | G06F 11/3006 709/223 |
| 2011/0137713 A1* | 6/2011 | Dalgas | G06Q 10/06393 705/7.39 |
| 2012/0203887 A1* | 8/2012 | Julien | G06F 11/3006 709/224 |

(Continued)

OTHER PUBLICATIONS

Gonçalves, Glauco, et al., A Standard to Rule Them All: Redfish, IEEE Communications Standards Magazine, vol. 3, Issue: 2, Jun. 2019, pp. 36-43, [retrieved on Jan. 26, 2022], Retrieved from the Internet: <URL:http://ieeexplore.ieee.org/>.*

(Continued)

*Primary Examiner* — Geoffrey R St Leger
(74) *Attorney, Agent, or Firm* — Fogarty LLP

(57) ABSTRACT

Support is provided for remote monitoring and management of non-standard devices of an IHS (Information Handling System) that are not supported by a remote management interface, such as the Redfish management interface. The IHS may be configured for remote management of a non-standard device as part of the manufacture of the IHS. Software for management of the non-standard device is validated against a checksum stored to the IHS during its manufacture to confirm the software for managing the non-standard device has not been altered. If the software is validated, the software is used to initialize a plugin for management of the non-standard device. Data collected by the plugin from monitoring of the non-standard device is provided to a remote access controller of the IHS and the remote access controller issues commands to the non-standard device via the plugin.

20 Claims, 7 Drawing Sheets

(56) References Cited

U.S. PATENT DOCUMENTS

2017/0116103 A1* 4/2017 Cencini .............. H04L 67/1042
2020/0293420 A1* 9/2020 Ayolasomyajula ..........................
                                                    H04L 41/0853

OTHER PUBLICATIONS

Kumari, Priyanka, et al., Validation of Redfish—The Scalable Platform Management Standard, UCC '17 Companion: Companion Proceedings of the 10th International Conference on Utility and Cloud Computing, Dec. 2017, pp. 113-117, [retrieved on Jan. 26, 2022], Retrieved from the Internet: <URL:http://dl.acm.org/>.*

Kinzhalin, Arzhan, et al., Enabling the Autonomic Data Center with a Smart Bare-Metal Server Platform, ICAC '09: Proceedings of the 6th international conference on Autonomic computing, Jun. 2009, pp. 87-96, [retrieved on Jan. 26, 2022], Retrieved from the Internet: <URL:http://dl.acm.org/>.*

Li, Jie, et al., MonSTer: An Out-of-the-Box Monitoring Tool for High Performance Computing Systems, IEEE International Conference on Cluster Computing (CLUSTER), Sep. 14-17, 2020, pp. 119-129, [retrieved on Jan. 26, 2022], Retrieved from the Internet: <URL:http://ieeexplore.ieee.org/>.*

* cited by examiner

SYSTEMS AND METHODS FOR REMOTE MANAGEMENT OF NON-STANDARD DEVICES

FIELD

The present disclosure generally relates to Information Handling Systems (IHSs), and, more particularly, to remote monitoring and management of components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as servers, that are installed within chassis and stacked within slots provided by racks. A data center may include large numbers of such racks. In some cases, such data center IHS may be locally managed by an administrator through a shared keyboard, video display, and mouse (KVM). However, effective management of data center IHSs typically also includes the use of remote management capabilities that allow administrators to monitor, manage and update IHSs over a network connection. In some cases, such remote management of an IHS includes remote management of individual hardware components of an IHS. Protocols exist that define interfaces for supporting such remote management of IHS and IHS hardware components, such as the Redfish remote management interfaces. However, such remote management interfaces are designed for supporting remote management of commonly used hardware components.

SUMMARY

Various embodiments provide IHSs (Information Handling Systems) that may include: a plurality of standard devices, wherein each standard device is remotely managed using a remote management interface; one or more non-standard devices that are not supported by the remote management interface; one or more processors; one or more storage drives comprising a file system provisioned with files for management of the non-standard devices during manufacture of the IHS; one or more memory devices coupled to the processors, the memory devices storing computer-readable instructions that, upon execution by the processors, cause operating system applications of the IHS to: retrieve software for management of a first of the non-standard devices, wherein the software comprises one or more files stored to the file system during manufacture of the IHS; validate the management software against a checksum stored to the file system during manufacture of the IHS; and when the management software is validated, using the files to initialize a first plugin for management of the first non-standard device; and a remote access controller comprising one or more logic units and further comprising one or more memory devices storing computer-readable instructions that, upon execution by the logic units, cause the remote access controller to: receive data collected from the first non-standard device by the first plugin; and issue commands to the first non-standard device via the first plugin.

In additional IHS embodiments, the first non-standard device is used to offload computing tasks from the one or more processors of the IHS. In additional IHS embodiments, the first non-standard device comprises an embedded component of one of the plurality of standard devices. In additional IHS embodiments, the remote management interface comprises the Redfish management interface. In additional IHS embodiments, the operating system applications of the IHS are configured to reject communications from plugins not identified as a plugin provisioned during manufacture of the IHS. In additional IHS embodiments, the first plugin runs in a dedicated process of the operating system of the IHS, and wherein the operating system applications are configured to reject communications from plugin processes other than the dedicated process of the first plugin. In additional IHS embodiments, the process of the first plugin is mapped to a location of the management software for the first plugin within the file system of the IHS and wherein the operating system applications refer to the mapping to determine when a communication is from a process other than the process of the first plugin.

In various additional embodiments, methods are provided for remote management of an IHS (Information Handling System) comprising a plurality of devices remotely managed using a remote management interface. The methods may include: identifying a non-standard device of the IHS, where the non-standard device is not supported by the remote management interface; retrieving software for management of the non-standard device, wherein the software comprises one or more files stored to a file system of the IHS during manufacture of the IHS; validating the management software against a checksum stored to the file system during manufacture of the IHS; when the management software is validated, using the files to initialize a first plugin for management of the first non-standard device, wherein the first plugin is initialized in a dedicated process; receiving data collected from the first non-standard device by the first plugin, wherein the data is received by a remote access controller of the IHS that supports remote management of the IHS; and issuing commands to the first non-standard device via the first plugin.

In additional method embodiments, the non-standard device is used to offload computing tasks from one or more processors of the IHS. In additional method embodiments, the non-standard device comprises an embedded component of one of the plurality of standard devices. In additional method embodiments, the remote management interface comprises the Redfish management interface. In additional method embodiments, operating system applications of the IHS are configured to reject communications from plugins not identified as a plugin provisioned during manufacture of the IHS. In additional method embodiments, the operating system applications are configured to reject communications from plugin processes other than the dedicated process of the first plugin. In additional method embodiments, the process of the first plugin is mapped to a location of the management software for the first plugin within the file system of the IHS and wherein the operating system applications refer to the mapping to determine when a communication is from a process other than the process of the first plugin.

In various additional embodiments, computer-readable storage devices are provided having instructions stored thereon for remote management of an IHS (Information Handling System) comprising a plurality of devices remotely managed using a remote management interface, wherein execution of the instructions by one or more processors of the IHS causes the one or more processors to: identify non-standard device of the IHS, where the non-standard device is not supported by the remote management interface; retrieve software for management of the non-standard device, wherein the software comprises one or more files stored to a file system of the IHS during manufacture of the IHS; validate the management software against a checksum stored to the file system during manufacture of the IHS; when the management software is validated, use the files to initialize a first plugin for management of the first non-standard device, wherein the first plugin is initialized in a dedicated process; receive data collected from the first non-standard device by the first plugin, wherein the data is received by a remote access controller of the IHS that supports remote management of the IHS; and issue commands to the first non-standard device via the first plugin.

In additional storage device embodiments, the non-standard device is used to offload computing tasks from one or more processors of the IHS. In additional storage device embodiments, the non-standard device comprises an embedded component of one of the plurality of standard devices. In additional storage device embodiments, the remote management interface comprises the Redfish management interface. In additional storage device embodiments, operating system applications of the IHS are configured to reject communications from plugins not identified as a plugin provisioned during manufacture of the IHS. In additional storage device embodiments, the operating system applications are configured to reject communications from plugin processes other than the dedicated process of the first plugin.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
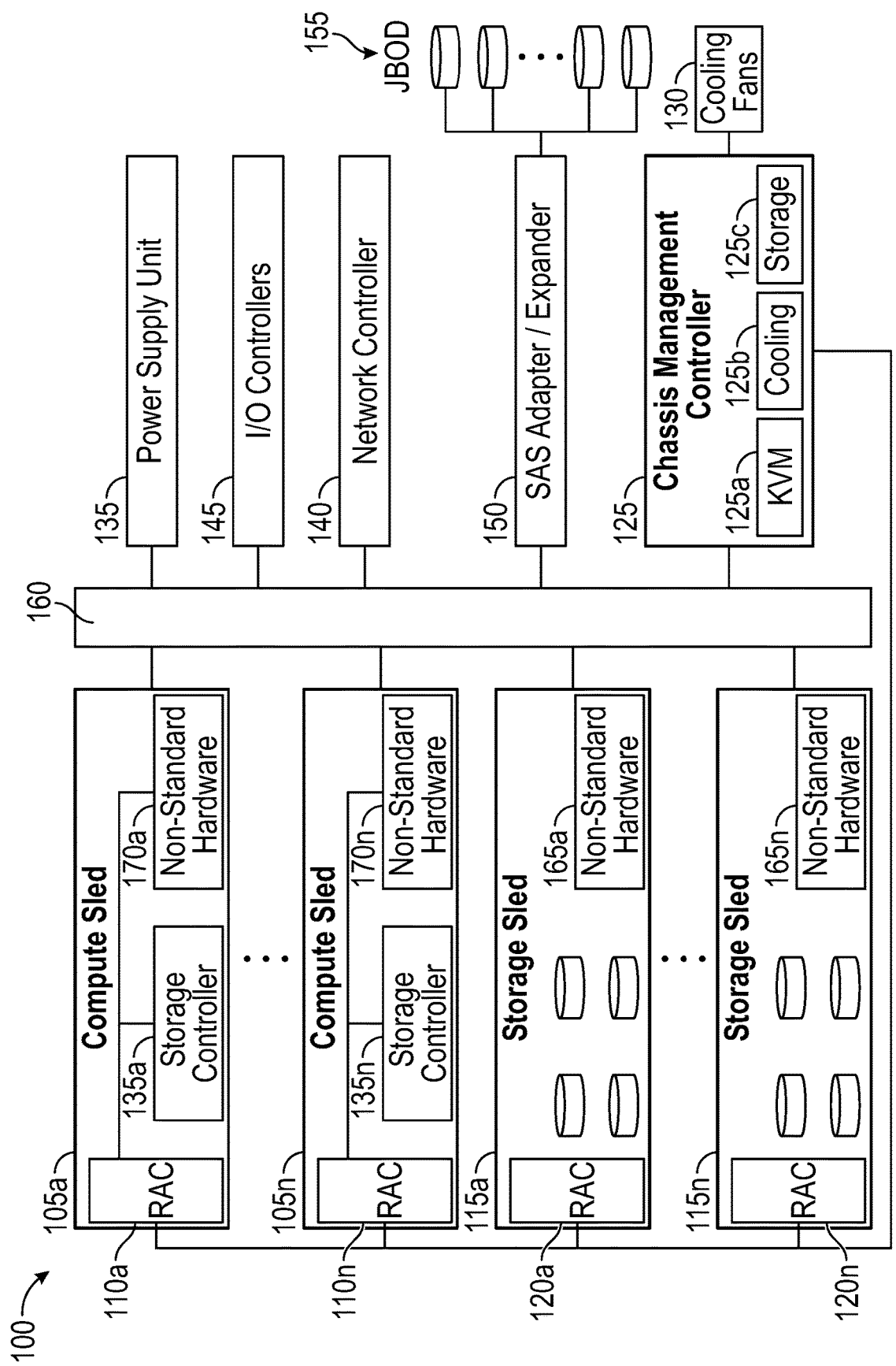
FIG. 1 is a diagram illustrating certain components of a chassis, according to some embodiments, for supporting remote management of non-standard hardware devices.

FIG. 1 is a block diagram illustrating certain components of a chassis 100 comprising one or more compute sleds 105a-n and one or more storage sleds 115a-n that may be configured to implement the systems and methods described herein for supporting remote management of non-standard hardware devices. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
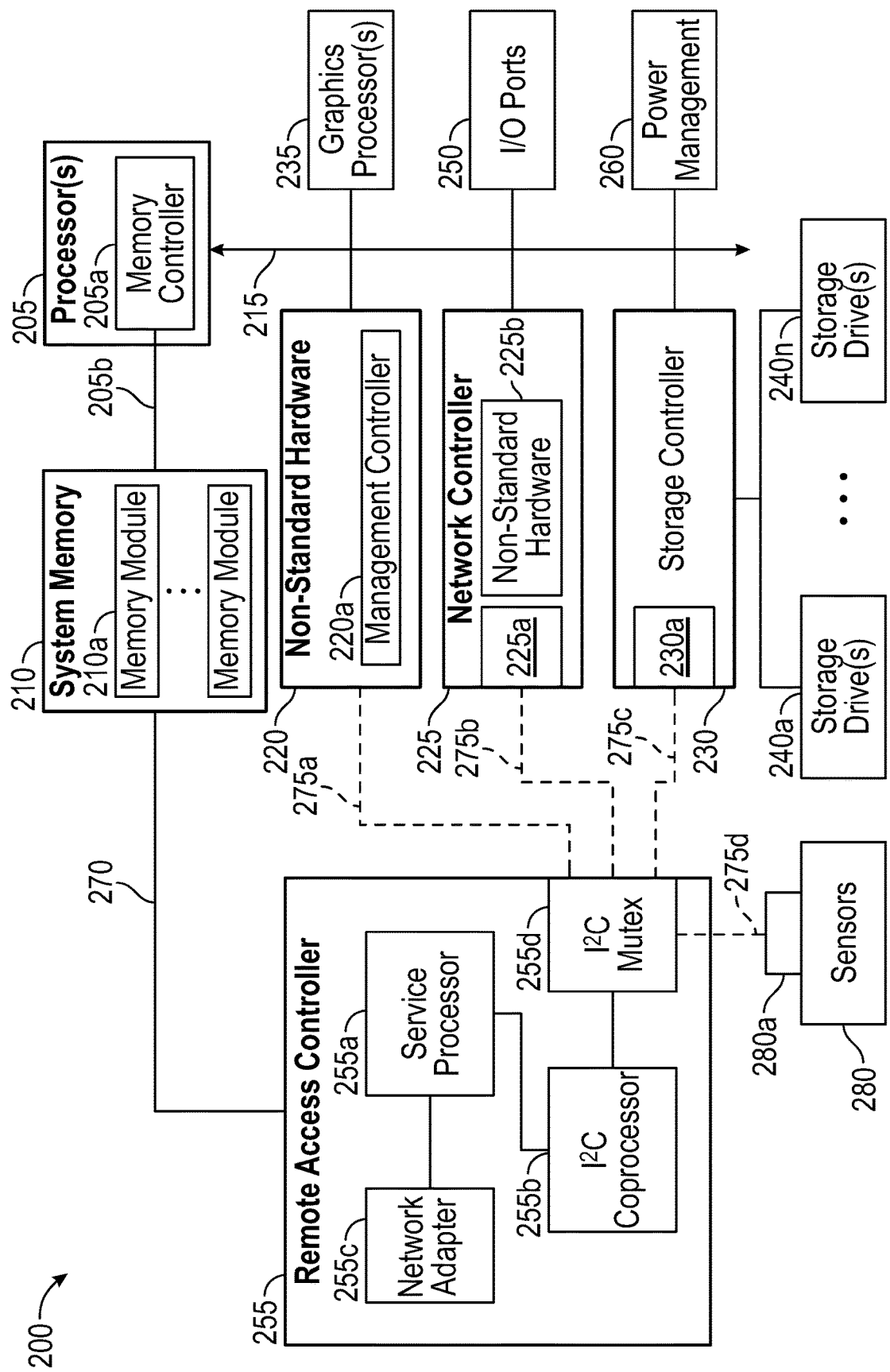
FIG. 2 is a diagram illustrating certain components of an IHS configured as a component of chassis, according to some embodiments, for supporting remote management of non-standard hardware devices of the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110a-n may utilize both in-band and sideband (i.e., out-of-band) communications with various components of a compute sled 105a-n and chassis 100. Remote access controllers 110a-n may collect sensor data, such as temperature sensor readings, from components of the chassis 100 in support of airflow cooling of the chassis 100 and the sleds 105a-n, 115a-n. In addition, each remote access controller 110a-n may implement various monitoring and administrative functions related to compute sleds 105a-n that require sideband bus connections with various internal components of the respective compute sleds 105a-n.

As described in additional detail below, remote access controllers 110a-n also support remote monitoring and management of various internal components of the respective compute sleds 105a-n via in-band communications that are supported by the operating systems of the respective compute sleds 105a-n. However, in scenarios where these managed devices are non-standard devices, such as hardware components that are configured to implement specialized functions, standardized management interfaces may not support remote management of these non-standard devices. In some scenarios, the specialized functions of these non-standard components may eventually be supported via a standardized management interface. In other scenarios, the specialized nature of these devices may result in these non-standard devices remaining unsupported by a standardized management interface. Embodiments resolve such issues in providing techniques for configuring remote management of non-standard devices that are not presently supported using standardized management interfaces.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100.

As illustrated, each of the compute sleds 105a-n may also include a non-standard hardware device 170a-n that customizes aspects of the operation of compute sled 105a-n, but due to the customizations, these devices 170a-n are not supported by standard interfaces for remote management of components. As described in additional detail with regard to the below embodiments, remote management of non-standard hardware devices 170a-n may be supported in a secure manner that does not require exposing the core operations of compute sleds 105a-n to the non-standard hardware devices 170a-n, thus mitigating the risk posed by supporting such customized components.

Each of the compute sleds 105a-n may include a storage controller 135a-n that may be utilized to access storage drives that are accessible via chassis 100. Some of the individual storage controllers 135a-n may provide support for RAID (Redundant Array of Independent Disks) configurations of logical and physical storage drives, such as storage drives provided by storage sleds 115a-n. In some embodiments, some or all of the individual storage controllers 135a-n may be HBAs (Host Bus Adapters) that provide more limited capabilities in accessing physical storage drives provided via storage sleds 115a-n and/or via SAS expander 150.

In addition to the data storage capabilities provided by storage sleds 115a-n, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located.

As illustrated, each storage sled 115a-n includes a remote access controller (RAC) 120a-n provides capabilities for remote monitoring and management of respective storage sleds 115a-n. As with the compute sleds, each of the storage sleds 115a-n may also include a non-standard hardware device 165a-n that customizes aspects of the operation of storage sleds 115a-n, but due to the customizations are not supported by standard interfaces for remote management of components. Remote management of non-standard hardware devices 165a-n may be supported by embodiments in a secure manner that does not require exposing the core operations of storage sleds 115a-n to the non-standard hardware devices 165a-n, thus mitigating the risk posed by supporting such customized components.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting remote management of non-standard hardware devices of the IHS 200. It should be appreciated that although the embodiments described herein may describe an IHS that is a compute sled or similar computing component that may be deployed within the bays of a chassis, other embodiments may be utilized with other types of IHSs that may also support remote monitoring of dynamic devices. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

The IHS 200 of FIG. 2 may be a compute sled, such as compute sleds 105a-n of FIG. 1, that may be installed within a chassis, that may in turn be installed within a rack. Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, IHS 200 may include one or more non-standard hardware components 220. In some embodiments, the non-standard hardware component 220 may also include a management controller 220a that may support interoperation with the remote access controller 255 via a sideband device management bus 275a. Each of the non-standard hardware components 220 supported by IHS 200 may include various processing and memory resources that have been specialized to support customized computing operations, such as specific signal processing, security, data mining, and artificial intelligence functions. Due to these specializations, remote management interfaces may not provide support for sideband 275a management of the non-standard component 220 by remote access controller 255 and/or for in-band 215 management of the non-standard component 220 by the operating system of IHS 200.

For instance, a non-standard hardware component 220 may include a specialized encryption card that is being used to offload certain encryption computations from processor 205. In this instance, standard management interfaces may not provide support for management for such specialized types of encryption devices. In other instances, standard management interfaces may not be able to support management of a device due how it has been configured. For example, non-standard hardware component 220 may include a fibre channel network card that has been configured with ports designated as target ports, rather than the typical initiator port configurations that would be used by a fibre channel network card installed in a server IHS. Such a configuration may be atypical and thus not supported by a standard management interface. In another example, a non-standard component 220 may support software defined storage capabilities in a manner that is currently not recognized by management interfaces. As described in additional detail below, remote management of non-standard hardware devices 220 may be supported by embodiments in a secure manner that does not require exposing the core operations of IHS 200 or of remote access controller 255 to the non-standard hardware devices 220, thus mitigating the risk posed by supporting such customized components.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. As illustrated, in some embodiments, network controller 225 may include an embedded non-standard hardware component 225b. For instance, in some embodiments, the embedded non-standard hardware 225b may be an FPGA module that has been programmed to implement cryptographic functions that are utilized by network controller 225. As with the described stand-alone non-standard hardware component 220, the embedded non-standard hardware component 225b may likewise be unsupported by standard management interfaces such that effective and secure remote management of such components is precluded without use of the described embodiments.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280. In certain embodiments, the endpoint I2C controller 280a of the non-standard hardware 220 may correspond to the management controller 220a described above.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
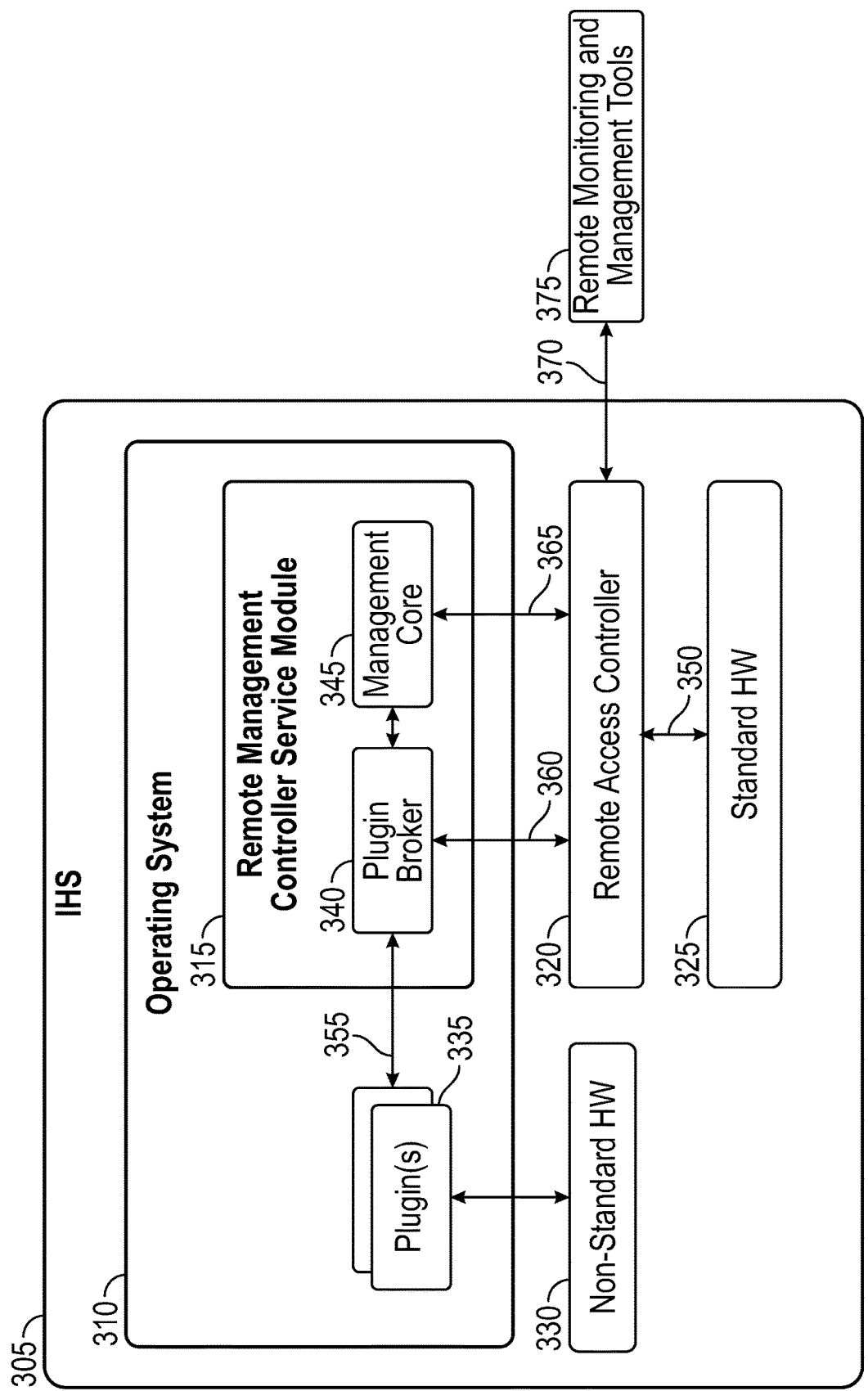
FIG. 3 is a diagram illustrating certain components of an existing system, for supporting remote management of non-standard hardware devices of an IHS.

FIG. 3 is a diagram illustrating certain components of an existing system, for supporting remote management of non-standard hardware devices of an IHS. In the system of FIG. 3, a remote access controller 320 is used to remotely manage hardware devices of an IHS 305. As illustrated, the hardware devices that are managed by the remote access controller 320 include various standard hardware devices 325. These standard hardware devices 325 may include various types of network controllers, storage controllers, processors, memory resources, storage devices and various other hardware components that may be managed remotely using a standardized remote management interface, such as the Redfish management interface. Such standard hardware components 325 may be accessed via a sideband management connection 350 by a remote access controller 320 and may also be accessed via an in-band management connection by the operating system 310 of the IHS.

The remote access controller 320 may collect telemetry data from these standard hardware components 325 both via the sideband management connection 350 and from the remote management controller service module 315 that operates within the operating system 310 of the IHS. The telemetry data collected by the remote access controller 320 may then be made available in various forms to administrators via remote management and monitoring tools 375. Since the standard hardware components 325 conform to an existing management interface, such as Redfish, the remote access controller 320 may provide telemetry data to the remote monitoring and management tools 375 via remote management messaging 370 that conforms to the remote management interface.

In some instances, the standard hardware components 325 are managed by the remote access controller 320 via an I2C interface 350, that may be implemented as a sideband management interface. In some instances, the remote management messages 370 communicated between the remote access controller 320 the systems management console 375 are conform to the Redfish remote management interface that is based on DMTF (Distributed Management Task Force) standards for device management.

However, as illustrated, IHS 305 may also include non-standard hardware components 330. As described, users of an IHS may choose to install customized, nonstandard hardware components in order to address particular computing needs. For instance, a user may install an FPGA card that has been programmed to provide specialized network management tasks that also include support for specialized cryptographic capabilities. In such a scenario, non-standard hardware components do not conform to existing remote management interfaces that are directed to supporting common hardware components that may be customized to some degree, but are still off-the-shelf components that are configured to support general-purpose applications. In some instances, the non-standard hardware components 330 may not conform to the I2C interfaces 350 supported by the remote access controller 325 but may instead provide an interface that can be accessed from the operating system 310 via IOCTL (input/output control) calls, vendor provided libraries or similar programming interfaces (API).

In order to support management of such nonstandard hardware 330, existing systems may resort to circumventing the remote management procedures that are implemented by the remote access controller 320. For instance, the operating system 310 may include modules, such as device plug-ins 335, that interface with the nonstandard hardware components 330 directly. Whereas the remote access controller 320 utilizes standard procedures for supporting the standard hardware components 325, each device plugin 335 that supports a nonstandard hardware component 330 must be customized to support the particular needs and capabilities of these nonstandard components. In many instances, such individualized treatment of nonstandard hardware components 330 results in security vulnerabilities because existing security procedures tend to be applied in a non-uniform manner and are instead adapted for each nonstandard hardware component 330. Additionally, the remote access controller 320 is limited in its abilities to provide remote tools 375 with visibility of the nonstandard hardware components 330 since there is no requirement for the nonstandard hardware component 330 to generate any particular telemetry data.

As described in additional detail below, embodiments provide a plugin architecture that may be supported by a component such as a remote access controller service module 315 by utilizing the interfaces provided by the non-standard devices 330 and by augmenting the remote access controller 320 capabilities which otherwise supports only standard devices 325. Embodiments thus provide the ability for use of a standard message management interface 370, such as Redfish, for remote management of both the standard 325 and non-standard 330 devices. When the non-standard devices 330 gain additional support, such as support by an I2C sideband management interface 360 or remote access controller 320, the management of such device may evolve to that of standard devices 330 without affecting the remote management by remote monitoring and management tools 375. In some cases, non-standard device may remain unsupported by standard remote management capabilities due to their specialized nature and may continue to be managed as described below as non-standard devices.

Figure 4:
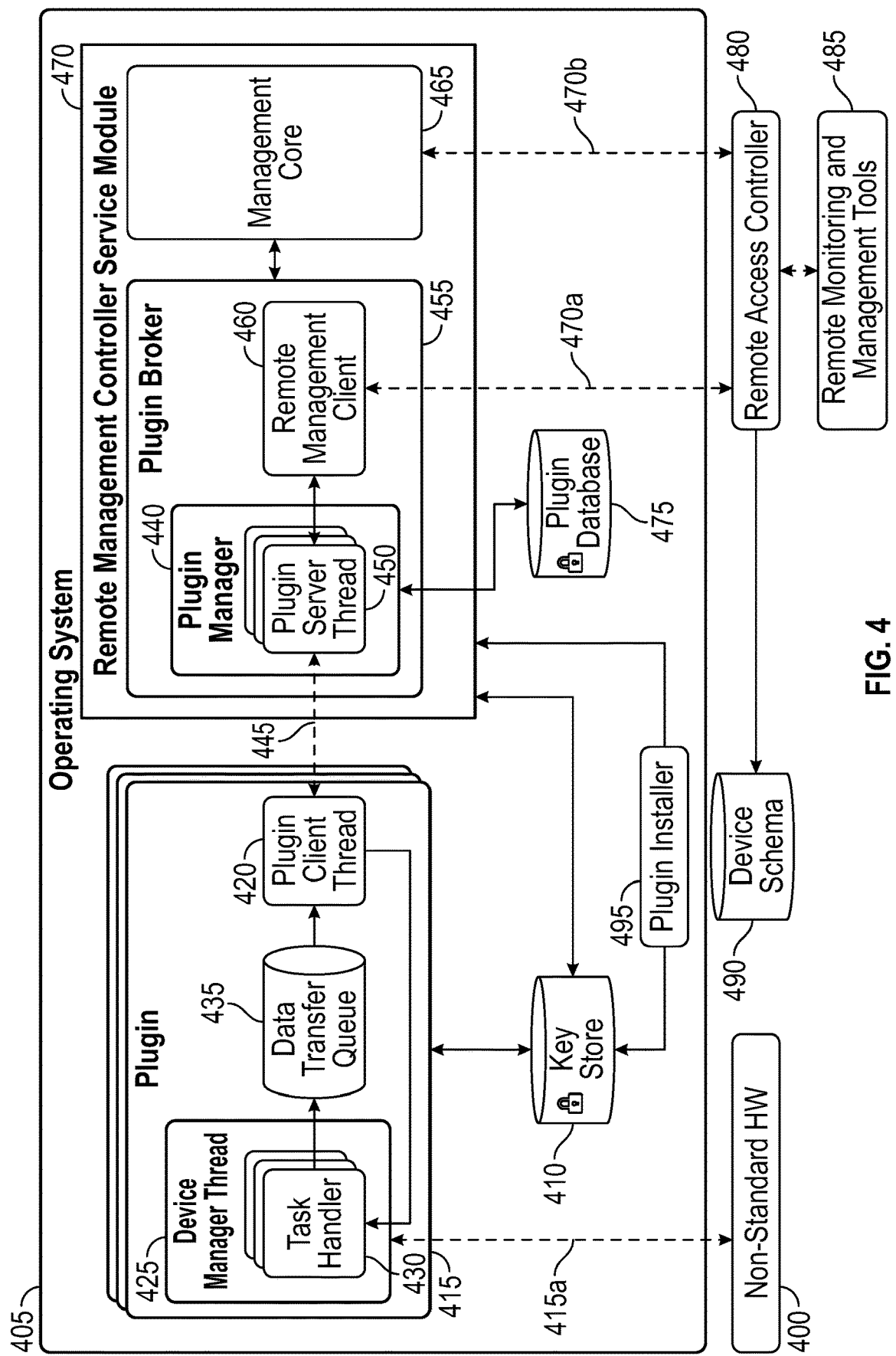
FIG. 4 is a diagram illustrating certain components of a system, according to some embodiments, for supporting remote management of non-standard hardware devices of an IHS.

FIG. 4 is a diagram illustrating certain components of a system, according to some embodiments, for supporting remote management of non-standard hardware devices 400 of an IHS, such as the illustrative non-standard hardware described with regard to FIGS. 1 and 2. In the embodiment illustrated in FIG. 4, remote management of nonstandard hardware components 400 of an IHS are supported, where administrators may utilize remote monitoring and management tools 485 that interface with an IHS via a remote access controller 480 of the IHS. This management by the remote access controller 480 is supported by an operating system application, such as a remote access controller services module 470. As described above, existing solutions for supporting non-standard hardware components require providing access to core management processes, such as the remote access controller services module 470, thus exposing these core management processes of the IHS to security vulnerabilities.

In order to support secure administration of nonstandard hardware components 400, embodiments utilize a plugin installer 495 that operates during provisioning of an IHS, which may include the initial provisioning of the IHS upon its manufacture. Plugin installer 495 may operate during provisioning of an IHS for a particular user or customer that has specified a nonstandard hardware component 400 that will be installed on the IHS, either during manufacture of the IHS or upon delivery of the IHS. As described in additional detail with regard to FIG. 5, during provisioning of an IHS for use of a non-standard hardware component 400, the plugin installer 495 generates security credentials that are associated with the nonstandard hardware component 400.

As illustrated in FIG. 4, the remote management controller services module 470 includes a management core 465 that implements core remote management functions and operates as a separate process from the plugin management aspects of the service module 470. Also as illustrated, the management core 465 communicates with the remote access controller 480 via a separate communication pathway 470b from the plugin operations pathway 470a utilized by the plugin broker 455, thus further isolating the core management operations from the plugin management aspects of the service module. Without any exposure to device plugins, the communication pathway 470b used by the management core 465 may utilize a mixture of standardized and proprietary communication interfaces in communicating with the remote access controller 480. As described in additional detail below, in some embodiments, the management core 465 may be configured to detect, during provisioning of an IHS for a customer, when a customer has indicated the IHS be configured for use of a non-standard hardware component 400.

Implemented as a separate process from the management core 465, the service module 470 may also utilize a plugin broker 455 that manages the various device plugins 415 that are used to support non-standard hardware components 400. The plugin broker 455 mitigates the risk posed by supporting non-standard hardware components by limiting communications with the remote access controller 480 to standardized remote management communications 470a, such as using the Redfish management interface. However, in order to support management of the non-standard operations of the non-standard device 400, plugin broker 455 utilizes inter-process communications (IPC) 445 with a plugin 415 that interfaces with the managed non-standard device 400.

As illustrated, the plugin broker 455 may utilize a remote management client 460 that communicates with the remote access controller 480 utilizing a standardized management interface 470a, such as the Redfish management interface. Via this management interface 470a, the remote management client 460 relays collected telemetry data from non-standard hardware 400 to the remote access controller 480. The remote management client 460 also receives commands and other messages from the remote management controller 480 via the management interface 470a for delivery to the plugins 415 that interface with the non-standard hardware 400. The plugin broker 455 may utilize a plugin manager 440 that manages the IPC messaging 455 with device plugins 415. In such embodiments, the plugin manager may utilize a separate plugin server thread 450 that is dedicated to queueing incoming and outgoing communications with a specific device plugin 415. In some embodiments, the plugin manager 440 may be tasked with loading device plugins 415 as separate processes that are isolated from the processes of the service module 470. In support of the IPC messaging with device plugins 415, in some embodiments, plugin manager 455 may support Unix domain socket IPC connections with each device plugin 415 and may thus implement a namespace for sharing data with each of the supported device plugins 415, where this namespace is isolated from the remaining components of the service module 470.

As described, each non-standard hardware component 400 is managed by a device plugin 415 that operates as a separate operating system process. As illustrated in FIG. 4, each device plugin 415 includes a client thread 420 that manages the IPC messaging with a corresponding sever thread 450 of the plugin manager 440. Each device plugin 415 may also include a separate device management thread 425 that interfaces with the non-standard hardware component 400 via communication pathway 415a. In various embodiments, the communication pathway 415a utilized by the device management thread 425 may include proprietary communication interfaces and other customized interfaces that are adapted to the particular computing capabilities of the non-standard hardware 400. In some embodiments, each device management thread 425 may be implemented using one or more task handlers 430 that provide the functions used to collect data from the non-standard hardware 400 and for relaying commands received from the remote access controller 480 to the non-standard hardware 400, such as commands to stop or start the non-standard hardware 400. In some embodiments, the device management thread 425 of a device plugin 415 may utilize a data transfer queue 435 for aggregating data collected from the non-standard hardware 400 until it can be transferred by the client plugin thread 420 to the service module 470. Since the plugin manager 440 of the service module 470 may manage numerous device plugins 415, the queues collected data in the transfer queue 435 until the plugin manager 440 is ready to receive data from that particular device plugin 415. In some embodiments, the plugin management 440 may support various development modes for supporting plugin development, such as debugging modes that provide diagnostic communications related to the loading and operation of plugins.

Figure 5:
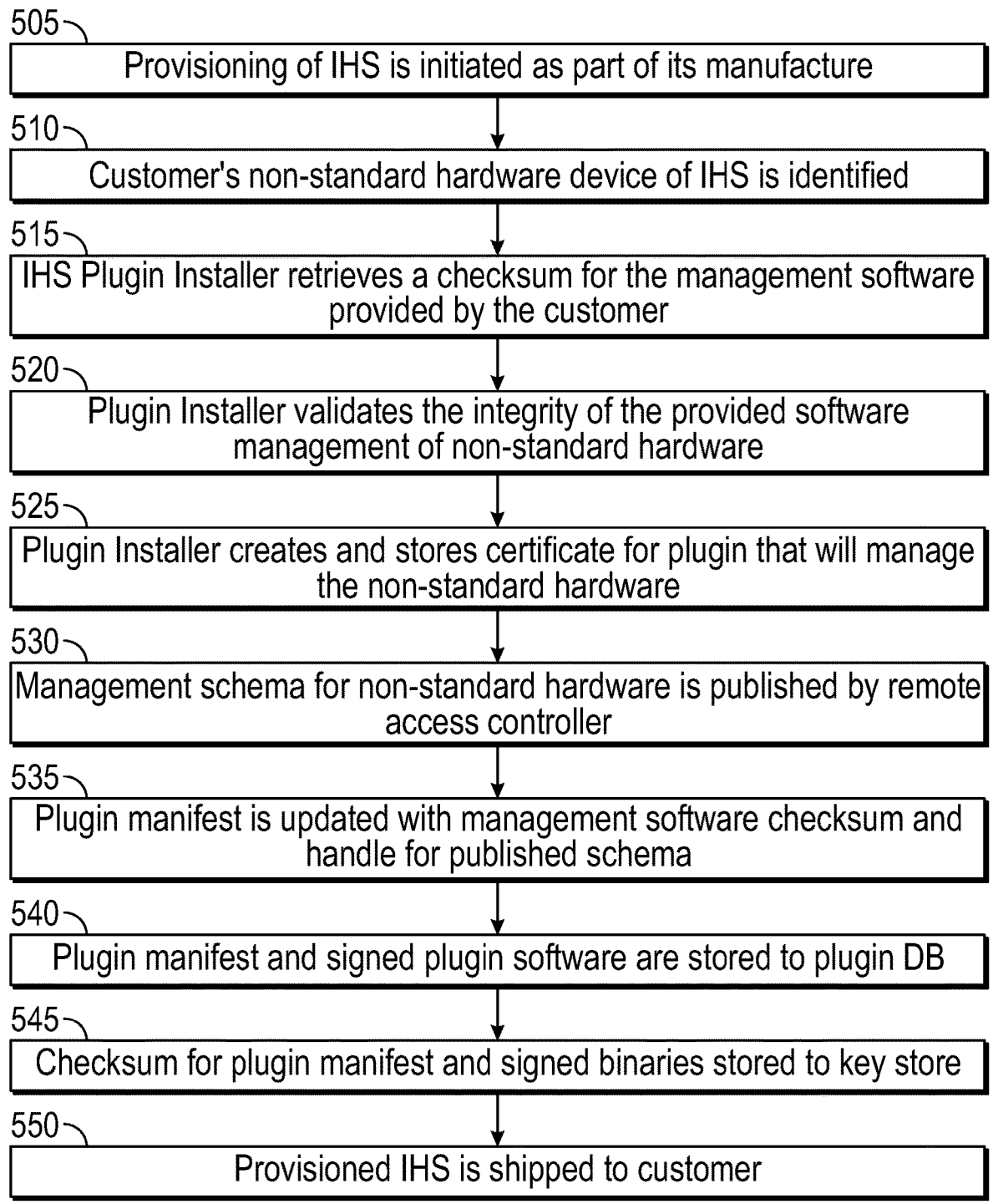
FIG. 5 is a flowchart describing certain steps of a method, according to some embodiments, for supporting remote management of non-standard hardware devices of an IHS.

FIG. 5 is a flowchart describing certain steps of a method, according to some embodiments, for supporting remote management of non-standard hardware devices of an IHS. An IHS, such as a server described with regard to FIGS. 1 and 2, may be manufactured using a factory process that includes multiple levels of assembly and provisioning before the server is shipped to a customer. In some instances, such server IHSs may be purpose-built servers that are assembled and provisioned according to specifications provided by a particular customer. The initial factory assembly of such server IHS may include installation of standard hardware. A second factory assembly process may then include the installation of non-standard devices, such as the described customized devices.

In some instances, a third factory process may install an operating system, which may include the described remote access controller service module, and may also configure a server IHS with an identity module (IDM) that includes firmware uploaded to the remote access controller, where the firmware may serve to rebrand and customize feature sets for a particular customer. In some embodiments, such an identity module may also specify configuration of the server for management of specific non-standard devices. In some embodiments, this third factory process also load a signed schema, such as a Redfish schema, for management of the non-standard device. In some instances, the schema may be loaded as a software update package to the remote access controller.

Embodiments may begin, at block 505, with the provisioning of the IHS as part of its manufacture for a specific customer and/or user, which includes provisioning the IHS for use of a non-standard hardware device, such as during the described third factory assembly phase. Once physical assembly of the IHS is completed, the IHS is powered and various diagnostic operations may be performed in order to validate the IHS has been physically assembled according to specifications. Upon the manufacture of the IHS being successfully validated, the IHS may be booted, including booting of the operating system of the IHS. As part of this provisioning process, at block 510, a non-standard hardware component of the IHS is identified, where this non-standard component is associated with the customer for which the IHS is being manufactured and provisioned. In some instances, the non-standard hardware component has been installed in the IHS as part of its manufacture such that the actual device may be detected. In other instances, the non-standard device will be installed by the customer upon delivery of the IHS such that the detection of block 510 is limited to identifying management software that has been provided by the customer for use in managing the non-standard hardware.

Regardless of whether the non-standard hardware is installed in the IHS during the described factory provisioning of the IHS, the customer requesting configuration of the IHS for management of a non-standard hardware component provides software for managing the non-standard hardware, such as part of the identity module installed during a prior assembly process of the IHS. For instance, in some embodiments, the customer may provide a library of task handlers, such as described with regard to FIG. 3, that define the management inputs and outputs that are supported by the non-standard hardware device. In some embodiments, the library of task handlers may be included in a binary file that may also include various additional libraries for use in communicating with the non-standard hardware. Accordingly, at block 510, the service module 470 may identify the software provided by the customer for the management of the non-standard hardware, such as a provided task handler library. In some embodiments, the management core 465 of the service module 470 may identify such customer software that is provided as part of an identity module that provides software for customizing the operation of the remote access controller 480 for that customer.

In some embodiments, the plugin installer 495 begins configuration of the IHS for supporting secure management of the non-standard hardware component. At block 515, the plugin installer retrieves a checksum associated with the software, such as the task handler library or the binary file that includes the task handler library, that has been provided by the customer, where the checksum is provided by the customer in conjunction with management software. In some embodiments, the plugin installer may retrieve the checksum via a query to a customer data source by the remote access controller of the IHS. Based on the retrieved checksum, at block 520, the integrity of the management software provided by the customer for the non-standard hardware is validated, thus ensuring that the software that will be used in configuring the IHS has not been modified since it was generated and distributed by the customer.

In some embodiments, factory provisioning continues, at block 525, with the plugin installer creating a self-signed client certificate, such as an x509 public key certificate, for use in supporting secure communications with the device plugin that will be used to manage the non-standard device. In some embodiment, the client certificate may be stored to a key store, such as described with regard to FIG. 4. As described above, a schema may be generated for management of non-standard hardware, where the schema may be deployed as a software update by the remote access controller. The schema may conform in part to a standardized management interface, such as Redfish, but may also include adaptations that account for the non-standard aspects of the non-standard hardware that is being supported. For instance, in scenarios where a non-standard device is determined to be of a known class, the schema will be based on existing schema models, such as using a standard storage device schema for a non-standard storage device that includes additional, non-standard capabilities. In such instances, the schema for the non-standard device may be a Redfish schema, where the additional capabilities of the non-standard device may be included in the schema using an OEM (Original Equipment Manufacturer) extension, as stipulated in the DMTF definitions for the Redfish schema. In scenarios where the non-standard device is of unknown class, the schema may utilize syntax and semantics prescribed by DMTF Redfish standards, but will create a custom device class for representing the non-standard device.

In utilizing such schemas in the management of the non-standard devices, a remote access controller may list the non-standard device of known classes along with other devices of that class and may list non-standard devices of unknown classes in another group of additional devices. When managing devices of a known class, the additional properties of a non-standard device may be highlighted or otherwise identified in a manner that distinguishes them from standard properties of similar devices of the same class. In order to support remote management of non-standard devices using such schemas, a remote access controller may communicate Redfish messages with remote tools by utilizing Redfish OEM extensions to provide information regarding non-standard aspects of non-standard devices.

The schema may specify the data that is being collected from the non-standard device and may specify some properties of the non-standard hardware. In some embodiments, the schema for a non-standard hardware device may be generated based on the inputs and outputs specified by the task handlers that have been provided for the non-standard hardware. In addition to a schema, a manifest may also be generated for the non-standard hardware, where the manifest specifies properties of the hardware and remote management functions supported by the hardware.

Using the generated certificate, the schema is signed and, at block 530, the device schema is provided to the remote access controller, where it may be published to the remote management tools. In some embodiments, the provisioning may continue with the plugin installer invoking an API of the plugin broker to activate the plugin. Once the plugin is initialized in its own process, an inter-process communication (IPC) pathway is established, in some cases via Unix Daemon Socket using mTLS, between the plugin and the plugin handler. As described above, this isolation of the device plugin allows the non-standard hardware to be supported, without exposing the core remote management processes to security vulnerabilities posed by the non-standard hardware.

Upon initializing the device plugin, the remote access controller generates a schema registration handle that serves as a reference to the activated plugin of the non-standard device and the plugin broker returns the handle associated with the activated plugin to the plugin installer. In some embodiments, the plugin installer proceeds to install and register the signed plugin with service module of the operating system for managing the non-standard device. At block 535, the plugin installer updates the manifest of the non-standard with the checksum for the provided management software, such as the task handler library or the binary that includes the task handler library, and also updates the manifest with the handle to the activated plugin. In some embodiments, the checksums of the management software that are stored to the manifest are generated using salted hash functions that utilize a salt value that is derived from a unique identifier associated with a specific operating system of an IHS. When such salted hash is utilized, the contents of the manifest cannot be validated by any other IHS, or by any other operating system on the same IHS, thus binding a manifest to a particular operating system instance. At block 540, the remote access controller stores the signed management software for non-standard device and the updated manifest to a plugin database.

At block 545, the plugin installer computes a checksum of the management software and the manifest and stores the checksum in the key store. If the plugin management software is validated, the operating system may be restarted and device plugin processes may be created, with IPC communication paths established between the running plugin manager and the device plugin. In some embodiments, multiple server IHSs may be configured in this manner to create a solution-specific cluster of servers that utilize management software 485 that supports management of the cluster. For instance, management software 485 such as DELL Open Manage Enterprise may be configured for management of such clusters of servers that include use of non-standard hardware. With provisioning of the IHS completed, at block 550, IHS is shipped to the customer.

Figure 6:
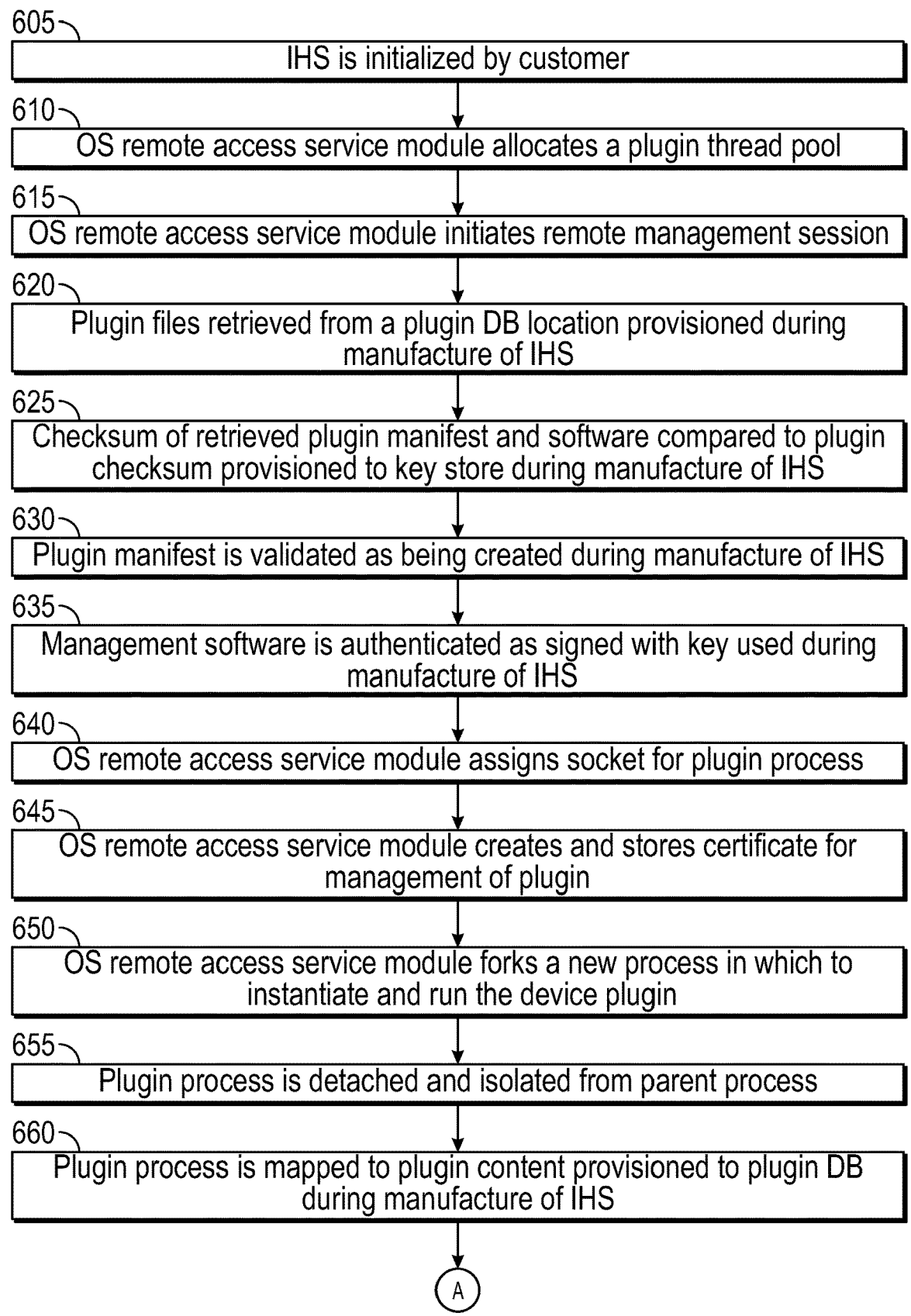
FIG. 6 is a flowchart describing certain steps of an additional method, according to some embodiments, for supporting remote management of non-standard hardware devices of an IHS.
Figure 6:
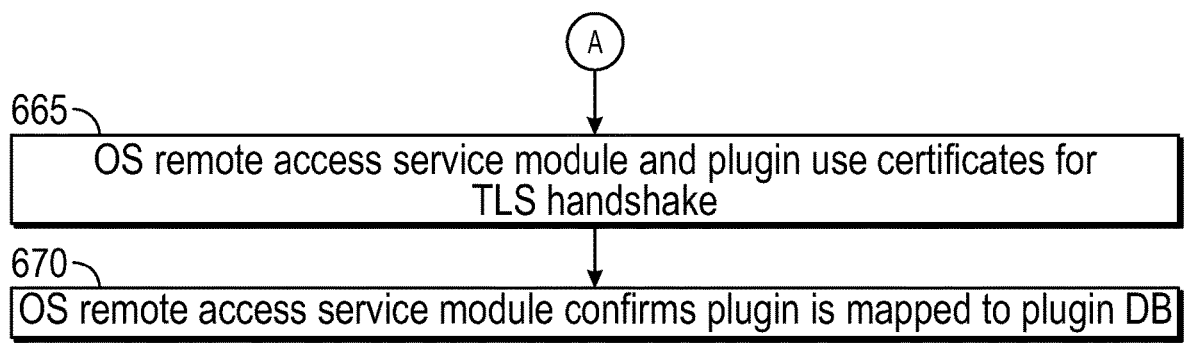

FIG. 6 is a flowchart describing certain steps of an additional method, according to some embodiments, for supporting remote management of non-standard hardware devices of an IHS. As described with regard to FIG. 5, embodiments support configuration of an IHS for remote management of non-standard hardware devices as part of a provisioning process that is conducted as part of the manufacture of the IHS. At block 605, an IHS that has been provisioned in the manner described with regard to FIG. 5 and shipped to the customer is initialized. As described, the non-standard hardware provisioned during the manufacture of the IHS provides customized computing functions for this specific customer.

After the IHS has been initialized and the operating system of the IHS has been booted, at block 610, the remote access service module that runs in the operating system may start the plugin broker, which may include a plugin handler that utilizes a listener thread and a pool of server threads that will each support different plugins. At block 615, the plugin broker initiates a remote management session, such as a Redfish session, in order to configure remote management communications with the remote access controller. At block 620, the plugin broker loads files for a device plugin for use in the management of a non-standard hardware component, where the files are loaded from the plugin database that was provisioned during the manufacture of the IHS. In particular, the loading of the plugin includes retrieving the signed plugin management software and the manifest for the plugin. The signed plugin management software may include the task handler library or a binary file that includes a task handler library and additional libraries for use in communicating with the plugin of the non-standard component.

At block 625, the plugin broker validates the retrieved management software and manifest by computing a checksum of these files and comparing it with a checksum retrieved from the operating system key store that was provisioned during manufacture of the IHS. As described, some embodiments may utilize salted hash functions in the generation of such checksums, where the salt value may be derived from a unique identifier of an operating system instance. In such embodiments, such a salt value may be obtained from the IHS operating system and used to validate the retrieved checksums. The plugin broker also validates the signature of the retrieved management software using the certificate, such as an x509 public key certificate, that was generated during manufacture of the IHS and stored to the key store. These validations ensure that the files that will be used to operate the plugin for management of the non-standard device have not been altered since the factory provisioning of the IHS, such as described in FIG. 5. In some embodiments, at block 630, the plugin broker separately validates the manifest file of the device plugin to ensure that the content has not been altered since provisioning of the IHS. At block 635, the plugin broker validates the signature of the signed management software to ensure that the software was signed using the public certificate of the manufacturer of the IHS. If the provided management software and the manifest of the non-standard device plugin are validated, the plugin broker adds the device plugin to a local cache of plugins to be loaded and initialized.

In some embodiments, loading and initialization of the device plugin for the non-standard component may continue, at block 640, with the plugin broker initializing a socket for IPC (inter-process communication) with the device plugin process. At block 645, the plugin broker creates a certificate, such an x509 public key certificate, for configuring TLS (Transport Layer Security) sessions with the device plugin and stores the certificate in the key store. As describe with regard to FIG. 4, the remote access service module of the operating system may include a plugin manager that is responsible for managing device plugins in a manner that isolates them from the core remote management processes. In such embodiments, at block 650, the plugin manger forks a new process for loading and initializing the device plugin. At block 655, the device plugin process is detached from the parent process of the plugin handler and all parent inherited handles are closed. In this manner, the device plugin operates in a separate address space from the remote management processes that run within the operating system, and notably in a separate address space from the management core of the remote access service module.

Some embodiments may continue initialization of a device plugin, at block 660, with the plugin manager mapping the process ID for the newly created device plugin process to the row of the plugin database to which the files for the device plugin were stored during the provisioning of the IHS. In the parent plugin handler process, a job may be created within a thread from the thread pool for monitoring the device plugin process for messages, such as collected metric data to be transmitted to the plugin handler. The job initiated by the plugin handler monitors the plugin process for messages. In some embodiments, the plugin handler may employ rate limiting for communications with each of the individual device plugins, thus preventing any of the plugins from taxing the processing capabilities of the IHS and supporting predictable demand for processing resources by the plugin handler. At block 665, the process of the device plugin and the plugin handler establish a daemon socket connection and complete a mutual TLS handshake using their respective public key certificates, such as x509 certificates. In some embodiments, the security provided by TLS may be augmented by the use of nonces or other random secrets that result in the communication of unique packets, even if the actual content of the communications does not change, thus thwarting attempts to spoof the device plugin using old communications. In some embodiments, additional rate limiting may be implemented with regard to the daemon socket connections utilized by the device plugins, thus limiting the plugins from consuming inordinate amounts of IHS resources.

With the device plugin operating, in some embodiments, at block 670, the plugin handler verifies that the process ID in use by the device plugin corresponds to the process ID mapped in the plugin database. This ensures that the plugin handler does not participate in any device plugin communications with processes other than the process created by the plugin handler for that particular device plugin. In this manner, device plugins for managing non-standard hardware may be safely operated in a manner that ensures that the software used to support the management of the non-standard hardware corresponds to software provided during factory provisioning of an IHS and has not been tampered with since.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
a plurality of standard devices, wherein each standard device is remotely managed using a remote management interface;
one or more non-standard devices that are not supported by the remote management interface;
one or more processors;
one or more storage drives comprising a file system provisioned with files for management of the non-standard devices during manufacture of the IHS;
one or more memory devices coupled to the processors, the memory devices storing computer-readable instructions that, upon execution by the processors, cause operating system applications of the IHS to:
retrieve software for management of a first of the non-standard devices, wherein the software comprises one or more files stored to the file system during manufacture of the IHS;
validate the management software against a checksum stored to the file system during manufacture of the IHS; and
when the management software is validated, using the files to initialize a first plugin for management of the first non-standard device; and
a remote access controller comprising one or more logic units and further comprising one or more memory devices storing computer-readable instructions that, upon execution by the logic units, cause the remote access controller to:

receive data collected from the first non-standard device by the first plugin; and issue commands to the first non-standard device via the first plugin.

2. The IHS of claim 1, wherein the first non-standard device is used to offload computing tasks from the one or more processors of the IHS.

3. The IHS of claim 1, wherein the first non-standard device comprises an embedded component of one of the plurality of standard devices.

4. The IHS of claim 1, wherein the remote management interface comprises the Redfish management interface.

5. The IHS of claim 1, wherein the operating system applications of the IHS are configured to reject communications from plugins not identified as a plugin provisioned during manufacture of the IHS.

6. The IHS of claim 1, wherein the first plugin runs in a dedicated process of the operating system of the IHS, and wherein the operating system applications are configured to reject communications from plugin processes other than the dedicated process of the first plugin.

7. The IHS of claim 6, wherein the process of the first plugin is mapped to a location of the management software for the first plugin within the file system of the IHS and wherein the operating system applications refer to the mapping to determine when a communication is from a process other than the process of the first plugin.

8. A method for remote management of an IHS (Information Handling System) comprising a plurality of devices remotely managed using a remote management interface, the method comprising:

identifying a non-standard device of the IHS, where the non-standard device is not supported by the remote management interface;

retrieving software for management of the non-standard device, wherein the software comprises one or more files stored to a file system of the IHS during manufacture of the IHS;

validating the management software against a checksum stored to the file system during manufacture of the IHS;

when the management software is validated, using the files to initialize a first plugin for management of the first non-standard device, wherein the first plugin is initialized in a dedicated process;

receiving data collected from the first non-standard device by the first plugin, wherein the data is received by a remote access controller of the IHS that supports remote management of the IHS; and issuing commands to the first non-standard device via the first plugin.

9. The method of claim 8, wherein the non-standard device is used to offload computing tasks from one or more processors of the IHS.

10. The method of claim 8, wherein the non-standard device comprises an embedded component of one of the plurality of standard devices.

11. The method of claim 8, wherein the remote management interface comprises the Redfish management interface.

12. The method of claim 8, wherein operating system applications of the IHS are configured to reject communications from plugins not identified as a plugin provisioned during manufacture of the IHS.

13. The method of claim 12, wherein the operating system applications are configured to reject communications from plugin processes other than the dedicated process of the first plugin.

14. The method of claim 13, wherein the process of the first plugin is mapped to a location of the management software for the first plugin within the file system of the IHS and wherein the operating system applications refer to the mapping to determine when a communication is from a process other than the process of the first plugin.

15. A non-transitory computer-readable storage device having instructions stored thereon for remote management of an IHS (Information Handling System) comprising a plurality of devices remotely managed using a remote management interface, wherein execution of the instructions by one or more processors of the IHS causes the one or more processors to:

identify a non-standard device of the IHS, where the non-standard device is not supported by the remote management interface;

retrieve software for management of the non-standard device, wherein the software comprises one or more files stored to a file system of the IHS during manufacture of the IHS;

validate the management software against a checksum stored to the file system during manufacture of the IHS;

when the management software is validated, use the files to initialize a first plugin for management of the first non-standard device, wherein the first plugin is initialized in a dedicated process;

receive data collected from the first non-standard device by the first plugin, wherein the data is received by a remote access controller of the IHS that supports remote management of the IHS; and issue commands to the first non-standard device via the first plugin.

16. The non-transitory computer-readable storage device of claim 15, wherein the non-standard device is used to offload computing tasks from one or more processors of the IHS.

17. The non-transitory computer-readable storage device of claim 15, wherein the non-standard device comprises an embedded component of one of the plurality of standard devices.

18. The non-transitory computer-readable storage device of claim 15, wherein the remote management interface comprises the Redfish management interface.

19. The non-transitory computer-readable storage device of claim 15, wherein operating system applications of the IHS are configured to reject communications from plugins not identified as a plugin provisioned during manufacture of the IHS.

20. The non-transitory computer-readable storage device of claim 19, wherein the operating system applications are configured to reject communications from plugin processes other than the dedicated process of the first plugin.

* * * * *